Sept. 25, 1951   W. KITTEL   2,568,749
CONTACT PLATE CONSTRUCTION
Filed July 31, 1947   2 Sheets-Sheet 1

INVENTOR.
WALTER KITTEL
BY
ATTORNEY

Sept. 25, 1951 W. KITTEL 2,568,749
CONTACT PLATE CONSTRUCTION

Filed July 31, 1947 2 Sheets-Sheet 2

INVENTOR.
WALTER KITTEL
BY

ATTORNEY

Patented Sept. 25, 1951

2,568,749

UNITED STATES PATENT OFFICE 2,568,749

CONTACT PLATE CONSTRUCTION

Walter Kittel, Gmunden, Austria

Application July 31, 1947, Serial No. 765,227
In Germany December 16, 1941

Section 1, Public Law 690, August 8, 1946
Patent expires December 16, 1961

22 Claims. (Cl. 261—113)

This invention relates to rectifying or contacting columns, wherein a liquid and a gaseous medium are brought into intimate contact, and more particularly to the construction of a contact plate for use in this type of contacting columns.

An object of the present invention is to provide a contact plate of such a construction that a highly efficient intimate contact between the liquid and the gaseous medium may be obtained in a contacting column equipped with such a contact plate or plates.

Another object of the present invention is to provide a contacting column wherein on one hand an intensive interchange of matter and/or heat may be obtained and on the other hand the gaseous medium passing through the plates is subject to a minimum of loss of pressure.

Another object of the present invention is to provide contact plates for use in contacting columns which may be used for a wide range of ratios between liquid and gaseous medium passing through the column.

A further object of the present invention is to provide contact plates for use in contacting columns which permit a uniform operation of the column although the plates might not be perfectly level when placed into the column.

Another object of the present invention is to provide plates for use in contacting columns which have only little dampening effect on the gaseous medium passing through the column.

Figure 1:
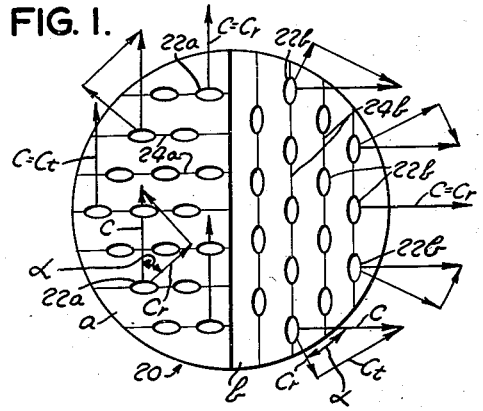
Figure 5:
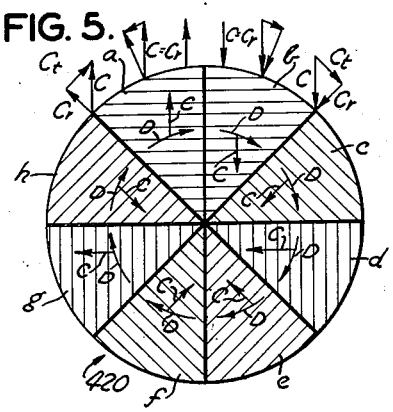
Figure 6:
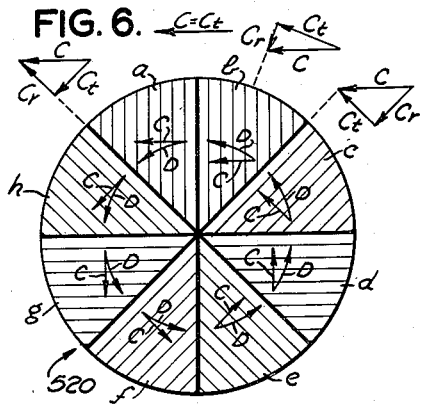
Figure 7:
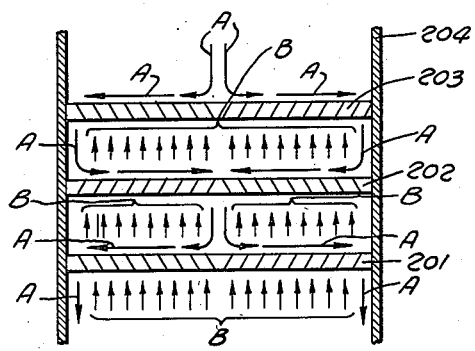
Figure 8:
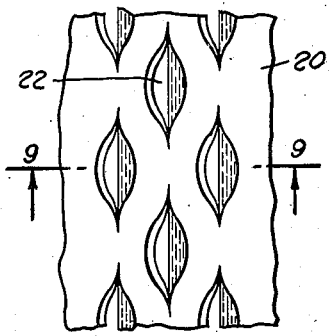
Figure 9:
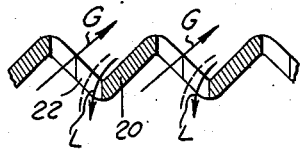

Other objects and structural details of the invention will be apparent from the following description when read in conjunction with the accompanying drawings forming part of this specification, wherein:

Fig. 1 is a diagrammatical illustration of a contact plate for a contacting column according to the invention, some vector-diagrams being shown, Figs. 2–6 represent diagrammatical illustrations of other embodiments of a contact plate for a contacting column according to the invention, Fig. 7 is a somewhat diagrammatical vertical sectional view of a contacting column according to the invention, Fig. 8 is a fragmentary top plan view of a contact plate according to the invention, and Fig. 9 is a sectional view taken on line 9—9 of Fig. 8.

Referring now to Fig. 1, 20 generally indicates a contact plate for use in a contacting column wherein a liquid and a gaseous medium, such as a gas or steam, are brought into intimate contact. Fig. 7, for example, illustrates diagrammatically a contacting column wherein three superimposed spaced plates 201, 202, 203 according to the invention are arranged in a casing 204. The flow of the liquid is indicated by the arrows A and the flow of the gas is indicated by the arrows B in said Fig. 7.

Referring now again to Fig. 1, the contact plate 20 having a circular circumference is divided into two zones $a$ and $b$. Each zone bounded by two radii of said plate and a portion of its circumference has a plurality of passages 22a, 22b respectively. In a preferred embodiment, the plate 20 is made of an expanded metal having spaced passages 22 of predetermined shape and cross-section in parallel linear rows as shown in Figs. 8 and 9. Each passage 22 extends from one surface of the plate 20 to the other surface thereof in a direction inclined to the plane of the plate. As shown in Fig. 1, the passages 22a of the zone $a$ are arranged in linear rows 24a indicated diagrammatically by thin lines and the passages 22b of the zone $b$ are arranged in linear rows 24b, the rows 24a and 24b being perpendicular to each other. The passages of each row are spaced from each other.

Assume now, that a gaseous medium passes through the passages 22a, 22b of the contact plate 20. As will be readily understood, each passage has its own field of forces determined by its position relative to the circumference and center of the plate 20 and by the angle $a$ (see Fig. 1) between the radius of the plate and the direction of movement imparted to the gaseous medium at the outlet of the particular passage. Therefore, individual vectorial equations of the general form $$C = C_t + C_r$$

(wherein $C$ denotes the total kinetic energy, $C_t$ denotes the tangential component of the kinetic energy, and $C_r$ denotes the radial component of the kinetic energy) may be applied to each passage for the vector analysis of the kinetic energy of the gaseous medium emanating from the passage.

In Fig. 1, a number of vector diagrams is applied to a number of passages 22a and 22b respectively. Each arrow $C$ drawn perpendicular to a line of rows 24a or 24b respectively indicates the projection on the plane of the plate of the direction of movement imparted to the gaseous medium at the outlet of the respective passage. The length of each arrow $C$ corresponds in a chosen scale to the value of the total kinetic energy of the gas. By way of vector diagrams shown in Fig. 1, the vector C at a passage may be resolved into a tangential component $C_t$ and a radial component $C_r$. Depending on the position of the passage relative to the center and to the circumference of the plate and depending on the angle (for example angle $a$) between the radius of the plate and the direction of movement of the gaseous medium, the values of the tangential component $C_t$ and of the radial component $C_r$ have a range between zero and the value of C. At some points $C=C_t$ and at some other points $C=C_r$. Thus, the liquid coming into contact with the gaseous medium will be symmetrically distributed over the surface of the plate; the liquid will be subject to a rotating motion and a motion in radial direction, either from the center of the plate towards the circumference of the latter or vice versa, depending on the direction of the radial component $C_r$ of the kinetic energy of the gaseous medium. Thus, the liquid has a spiralic motion, while the gaseous medium contacts the liquid some times in counter-current, sometimes in unidirectional current. The shape of the passages is of less importance for an effective interchanging operation in the column than is the arrangement of the passages or their outlets in a predetermined direction. The plate may be provided with the passages in any desired manner. For example, the plate may have a series of apertures of any desired cross-section extending through the material of the plate in an inclined direction from one surface thereof to the other surface thereof. Or, the plate is composed of a series of profiled elements. Or, the plate is provided with a series of profiled sheets. Or, the plate is made of profiled sheets, such as corrugated iron sheets provided with openings capable of imparting to the gaseous medium passing through said openings a movement in a direction inclined to the plane of the plate. When a plate or plates according to the invention are used in an upright rectifying or contacting column wherein the gaseous medium is supplied at the lower portion thereof, the passages cause an interruption of a straight upward movement of the gaseous medium and cause same to move in an inclined direction with the result described above.

According to Fig. 1, the plate 20 is divided into two zones $a$ and $b$. The passages 22$a$ and 22$b$ respectively are arranged in parallel rows 24$a$ and 24$b$, the rows 24$a$ being perpendicular to the rows 24$b$, and the passages being spaced from each other in each row. Furthermore, the passages 22$a$ of the zone $a$ are arranged in such a way, preferably by inclination as described above, that the direction of motion of the gaseous medium emananting from said passages is perpendicular to the direction of motion of the gaseous medium emanating from the passages 22$b$ of the zone $b$, as indicated by the arrows C in the zones. In other words, the passages 22$a$ of the zone $a$ are inclined in a direction perpendicular to the direction of the inclination of the passages 22$b$ of the zone $b$.

Figure 2:
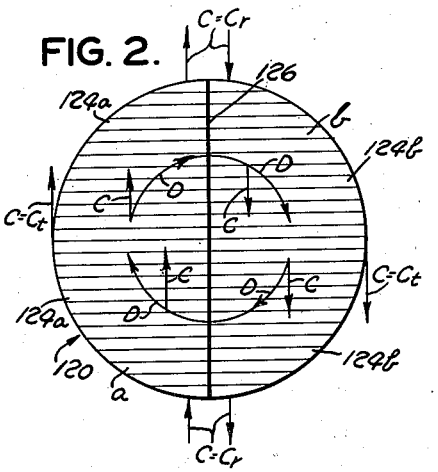

According to the embodiment shown in Fig. 2, the plate 120 is also divided into two zones $a$ and $b$, each zone having a number of passages arranged spaced from each other in parallel rows 124$a$ and 124$b$ respectively diagrammatically indicated by thin lines. However, the passages of the zone $a$ are inclined to the plane of the plate 120 in a direction opposite to the direction of inclination of the passages of the zone $b$, so that, likewise, the direction of movement imparted to the gaseous medium in said two zones are opposite to each other, as indicated by the arrows C being at right angles to the linear rows 124$a$ and 124$b$ respectively. It will be readily understood, that the radial component $C_r$ of the kinetic energy along the line 126 separating the zones $a$ and $b$ from each other is equal to the total kinetic energy C, i. e. $C=C_r$ and $C_t=O$. The value of said radial component $C_r$ continuously decreases from said separating line 126 with increasing distance from the latter, until its value is reduced to zero at the point where the radius perpendicular to said separating line intersects the circumference of the plate, so that at said point of intersection the tangential componet $C_t$ is equal to the total energy C. Such an arrangement of the passages combined with the division of the plates into two zones $a$ and $b$ wherein motions in opposite directions are imparted to the gaseous medium result in a symmetrical distribution of the liquid along the entire plate. The curved arrows D indicate the movement of the liquid.

Figs. 1 and 2 illustrate a symmetrical division of the plate into two zones. If desired, however, the plate may also be divided into two zones of asymmetrical arrangement wherein the passages are inclined in different directions so as to impart to the gaseous medium motions in different directions.

Furthermore, the plate may be divided into more than two zones as illustrated by Figs. 3–6, wherein the parallel lines indicate the parallel rows of spaced passages provided for in every zone. The straight arrows C indicate the direction of motion imparted to the gaseous medium, said direction being perpendicular to said parallel lines. The curved arrows D indicate the motion of the liquid. Vector diagrams are applied to points at the circumferences of the plates.

Figure 3:
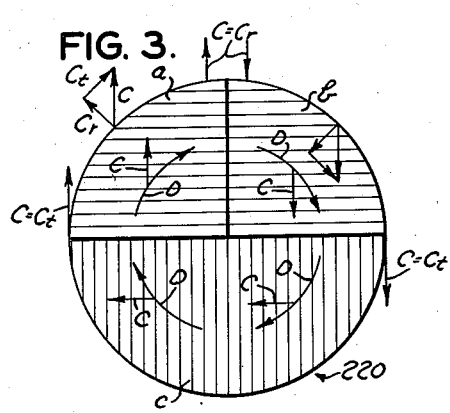

According to the embodiment shown in Fig. 3 the plate 220 is divided into three zones $a$, $b$ and $c$ of asymmetrical arrangement, each zone being bounded by two radii and a portion of the circumference of the plate. The passages of the adjacent zones $a$ and $b$ are designed and arranged in such a way, that the direction of motion (indicated by arrows C) of the gaseous medium emanating from the passages of the zone $a$ is opposite to the direction of motion of the gaseous medium emanating from the passages of the zone $b$. The passages of the zone $c$ are designed and arranged in such a way, that the direction of motion of the gaseous medium emanating from the passages of said zone $c$ is perpendicular to the direction of motion of the gaseous medium emanating from the passages of the zones $a$ and $b$.

Figure 4:
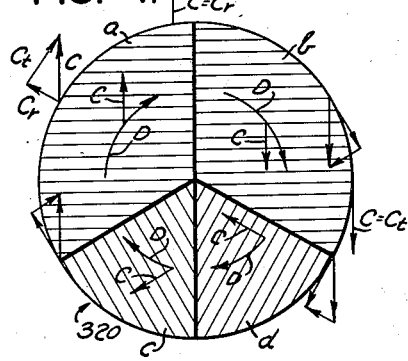

According to Fig. 4 the plate 320 is divided into four zones $a$, $b$, $c$ and $d$. The passages of the adjacent zones $a$ and $b$ discharge the gaseous medium in opposite directions. The passages of the zones $c$ and $d$ are arranged and designed in such a way, that the passages of the zone $c$ impart to the gaseous medium a direction of motion which is at an angle to the direction of motion of the gaseous medium emanating from the passages of the zone $d$ and to the direction of motion of the gaseous medium discharged by the passages of the zones $a$ and $b$.

According to Fig. 5 the plate 420 is divided into eight zones $a$, $b$, $c$, $d$, $e$, $f$, $g$ and $h$. The passages of the various zones are arranged and designed in such a way that the direction of motion imparted to the gaseous medium in each zone differs from the direction of motion imparted to the gaseous medium in the adjacent zone, and that the directions of motions in the zones $a$ and $b$ are opposite to each other. Moreover, the direction of motion of the gaseous medium in six zones (out of eight), i. e. in the zones $b$, $c$, $d$, $e$, $f$ and $h$, is directed towards the center of the plate, whereby a flow of the liquid from the circumference of the plate towards the center thereof is effected.

According to Fig. 6 the plate 520 is also divided into eight zones $a$, $b$, $c$, $d$, $e$, $f$, $g$ and $h$. However the parallel rows of passages in the various zones are arranged in a different manner, and while the directions of motion imparted to the gaseous medium in the zones $c$, $d$, $e$, $f$, $g$, $h$ differ from each other and from the direction of motion imparted to the gaseous medium in the zones $a$ and $b$, the direction of motion in said last mentioned zones $a$ and $b$ is the same. This arrangement of the spaced passages favors a rotating motion of the liquid with high angular momentum and suppresses the radial component of the motion. The angular momentum of the tangential motion of the liquid results in a high degree of stability of the flow of the liquid, so that the plates when inserted as interchanging plates in a contacting column operate satisfactorily over a great range of ratio between liquid and gaseous medium and that the efficiency of the plates is not reduced if the plates should not be perfectly level.

The division of a plate into a great number of zones as illustrated by Figs. 5 and 6 contributes to an improvement of the contact between the liquid and the gaseous medium. Moreover, according to the arrows D shown in Fig. 5 the liquid rotates in clockwise direction, while according to the arrows D shown in Fig. 6 the liquid rotates in counterclockwise direction, said reversed motion of the liquid being obtained by the arrangement of the parallel rows of the passages at right angles relative to each other in comparable zones of said two embodiments.

If the plate is divided into more than two zones as illustrated by Figs. 3–6, the directions of motion imparted to the gaseous medium in at least two zones are opposite to each other or the directions of motion in two adjacent zones are at right angles to each other or they are in asymmetrical arrangement. The arrangement of the passages in parallel rows and at certain inclinations in the various zones results in an excellent mixing of the liquid and the gaseous medium.

The radial component of the kinetic energy of the gaseous medium causes a motion of the liquid from the center of the plate towards the circumference thereof (assisted by the centrifugal force) or vice versa (counter-acting the centrifugal force). The great variety of modifications with respect to number, surface, direction and angle of zones renders possible to obtain any desired flow of the liquid on an interchanging plate in a contacting column favoring the radial or tangential direction or alternating the direction of rotation.

For, if as indicated by Figs. 1–6 a plate is divided into two or more zones and each zone is uniformly composed of profield elements or of plates or metal sheets provided with passages of suitable cross-section or profile, defined fields of forces are formed in the individual zones when acted upon by the gaseous medium; the impulses of the forces having the same direction of rotation will be added one to another and will perimt many variations according to their number and direction as will be readily understood from the vector diagrams shown in said figures.

The perfect stabilization of the pattern of flow combined with the uniform distribution of the liquid over the entire plate according to the invention eliminates an undue dampening effect on the gaseous medium as it is encountered in hitherto known contacting columns. The increase in the opening ratio of the plate according to the invention results in a considerable reduction of loss in pressure. The zones of a plate illustrated by Figs. 1–6 may be made of expanded metal in its profield form as shown in Figs. 8 and 9. Preferably, the portions of the expanded or corrugated metal adjacent the apertures or passages 22 thereof are bent into directions inclined to the plane of the plate made of said expanded or corrugated metal as may be gathered from Figs. 8 and 9. Thus, a gaseous medium passing through said passages flows in an inclined direction as indicated by the arrows G in Fig. 9. The numerous and comparatively large passages of the expanded metal reduce considerably the resistance of the plate to the flow of the gaseous medium. Moreover, as indicated by the arrows L in Fig. 9, the liquid being subject to a dynamically fixed path along the surface of the plate may flow through said passages 22 at the center or near the circumference of the plate in counter-current to the gaseous medium without being impeded by the latter although the amount of gaseous medium supplied to the rectifying column may be high. Expanded metal having passages of more or less rhombical shape is especially useful for this purpose.

Plates according to the invention may be used individually or in numbers. The plates, however, are most effective when a plurality thereof is used in spaced superimposed arrangement, for example in a contacting column. According to Fig. 7, for example, a group of three plates 201, 202, 203 is arranged in the casing 204 of a rectifying or contacting column. The plates may be mounted in said casing in any suitable manner as is customary in the art of contacting columns. Fig. 7 illustrates only three plates, but it is understood that any desired number of plates may be used. Owing to the negligible dampening action of a plate according to the invention it is possible to arrange more plates in a contacting apparatus than it can be done in hitherto customary apparatus of this type. It will be readily understood, that the use of a large number of plates in a contacting apparatus or the like contributes to an improvement of the efficiency thereof. In Fig. 7, the plates 201—203 are shown in a diagrammatical way, the inclined lines thereof giving indication of the direction of movement of the gaseous medium through said plates. It is understood, that the plates may be made in any desired manner as described above and that any plate of the types shown in Figs. 1–6 or of any other suitable construction according to the invention may be used in a column illustrated by Fig. 7.

In Fig. 7 the arrows A indicate the flow of the downwardly flowing liquid and the arrows B indicate the flow of gaseous medium flowing upwardly in counter-current to the liquid. According to Fig. 7 the inclination of the passages of the set of plates is alternately directed, so that, in turn, the radial component of the flow of liquid alternates from plate to plate as indicated by the arrows. By making the radial component of a certain value which may be obtained for example by using a plate as shown in Fig. 5 with a great number of zones, it is possible to counteract undesired centrifugal forces caused by a rapid rotation of the liquid. Besides the fact, that such a spiralic motion of the liquid eliminates the formation of dead spaces by stagnating liquid, the way of the liquid will also be lengthened whereby an efficient crossing flow of current is obtained. The kinetic energy remaining in the gaseous medium after passing the liquid layer will be transformed between two plates exclusively into rotating motion of the gaseous medium, whereby drops of liquid which might be carried along by the gaseous medium are automatically separated by centrifugal action. Normally, the liquid will flow through the passages in countercurrent to the gaseous medium; in some cases, however, it may be advisable to arrange an overflow or a drain-pipe similar to those used in connection with plates of the bubble-cap type.

I have described preferred embodiments of my invention, but it is understood that this disclosure is for the purpose of illustration and that various omissions or changes in shape, proportion and arrangement of parts, as well as substitution of equivalent elements for those, herein shown and described, may be made without departing from the spirit and scope of the invention as set forth in the appended claims.

What I claim is:

1. A contact plate for use in a contacting column wherein a liquid and a gaseous medium are brought into intimate contact, said plate having a circular circumference and being divided into at least two zones, each zone being bounded by two radii of said plate and a portion of its circumference and having a plurality of passages extending from one surface of the plate to the other surface thereof and being capable of conducting the gaseous medium through the plate, the passages of each zone being arranged in series of substantially linear parallel rows, the passages of each row being spaced from each other, the outlets of the passages for the discharge of the gaseous medium in each zone being inclined in the same direction to the plane of the plate so as to impart to the gaseous medium a motion in a transverse direction, and the outlets of the passages of different zones being inclined in different directions.

2. A contact plate for use in a rectifying or contacting column wherein a liquid and a gaseous medium are brought into intimate contact, said plate having a circular circumference and being divided into at least two zones, each zone being bounded by two radii of said plate and a portion of its circumference and having a plurality of passages extending from one surface of the plate to the other surface thereof and being capable of conducting the gaseous medium through the plate, the passages of each zone being arranged in series of substantially linear parallel rows, the passages of each row being spaced from each other, said passages in each zone being inclined in the same direction to the plane of the plate so as to impart to the gaseous medium at the point of discharge a motion in a transverse direction, and the passages of different zones being inclined in different directions.

3. In a contact plate as claimed in claim 1, the portions of said plate comprising the passages being made of expanded metal.

4. In a contact plate as claimed in claim 1, each zone being provided with a plurality of apertures of predetermined cross-section forming said passages, and portions of said plate adjacent said apertures being bent in directions inclined to the plane of the plate.

5. A contact plate as claimed in claim 1, said plate comprising two zones, and the outlets of the passages of one zone being inclined in a direction perpendicular to the direction of inclination of the outlets of the passages of the other zone.

6. A contact plate as claimed in claim 2, said plate comprising two zones, and the passages of one zone being inclined in a direction perpendicular to the direction of inclination of the passages of the other zone.

7. A contact plate as claimed in claim 1, said plate comprising two zones, and the outlets of the passages of one zone being inclined in a direction opposite to the direction of inclination of the outlets of the passages of the other zone.

8. A contact plate as claimed in claim 2, said plate comprising two zones, and the passages of one zone being inclined in a direction opposite to the direction of inclination of passages of the other zone.

9. A contact plate as claimed in claim 1, said plate comprising more than two zones, and the outlets of the passages of at least two zones being inclined in opposite directions.

10. A contact plate as claimed in claim 2, said plate comprising more than two zones, and the passages of at least two zones being inclined in opposite directions.

11. A contact plate as claimed in claim 1, said plate comprising more than two zones, and the outlets of the passages of adjacent zones being inclined in different directions.

12. A contact plate as claimed in claim 2, said plate comprising more than two zones, and the passages of adjacent zones being inclined in different directions.

13. A contact plate as claimed in claim 1, said plate comprising more than two zones of asymmetric arrangement, and the outlets of the passages of at least two adjacent zones being inclined in different directions.

14. A contact plate as claimed in claim 2, said plate comprising more than two zones of asymmetric arrangement, and the passages of at least two adjacent zones being inclined in different directions.

15. A contact plate as claimed in claim 1, said plate comprising more than two zones of symmetric arrangement, and the outlets of the passages of two adjacent zones of said plurality of zones being inclined in opposite directions.

16. A contact plate as claimed in claim 2, said plate comprising more than two zones of symmetric arrangement, and the passages of two adjacent zones of said plurality of zones being inclined in opposite directions.

17. A contact plate as claimed in claim 1, said plate comprising more than two zones of symmetric arrangement, and the outlets of the passages of two adjacent zones of said plurality of zones being inclined in the same direction.

18. A contact plate as claimed in claim 2, said plate comprising more than two zones of symmetric arrangement, and the passages of two adjacent zones of said plurality of zones being inclined in the same direction.

19. A contacting column for bringing a liquid and a gaseous medium into intimate contact, comprising: a cylindrical casing, a plurality of spaced superimposed plates arranged in said casing, each plate having a circular circumference and being divided into at least two zones, each zone of each plate being bounded by two radii of said plate and a portion of its circumference and having a plurality of passages extending from the lower surface of the plate to the upper surface thereof and being capable of conducting the gaseous medium through the plate, the passages of each zone of each plate being arranged in series of substantially linear parallel rows, the passages of each row being spaced from each other, the outlets of the passages of each plate for the discharge of the gaseous medium in each zone being inclined in the same direction to the plane of the plate so as to impart to the gaseous medium a motion in a transverse direction, the outlets of the passages of different zones of each plate being inclined in different directions, and the inclination of the outlets of the passages of the plurality of plates in the casing being alternately directed.

20. A contacting column for bringing a liquid and a gaseous medium into intimate contact, comprising: a circular casing, a plurality of spaced superimposed plates arranged in said casing, each plate having a circular circumference and being divided into at least two zones, each zone of each plate being bounded by two radii of said plate and a portion of its circumference and having a plurality of passages extending from the lower surface of the plate to the upper surface thereof and being capable of conducting the gaseous medium through the plate, the passages of each zone of each plate being arranged in series of substantially linear parallel rows, the passages of each row being spaced from each other, the passages of each plate in each zone being inclined in the same direction to the plane of the plate so as to impart to the gaseous medium at the point of discharge a motion in a transverse direction, the passages of different zones of each plate being inclined in different directions, and the inclination of the passages of the plurality of plates in the casing being alternately directed.

21. In a contact plate as claimed in claim 1, the outlets of the passages in each zone extending parallel to each other.

22. In a contact plate as claimed in claim 2, the passages in each zone extending parallel to each other.

WALTER KITTEL.

REFERENCES CITED

The following references are of record in the file of this patent:

UNITED STATES PATENTS

| Number | Name | Date |
| --- | --- | --- |
| 948,432 | Rudeen | Feb. 8, 1910 |
| 1,442,414 | Rose | June 16, 1923 |
| 1,986,736 | Manthe et al. | Jan. 1, 1935 |
| 2,003,271 | Beimann et al. | May 28, 1935 |
| 2,070,067 | Rice | Feb. 9, 1937 |
| 2,078,089 | Mart | Apr. 20, 1937 |
| 2,091,349 | Bergman | Aug. 31, 1937 |
| 2,338,446 | Lambert | Jan. 4, 1944 |